United States Patent Office 2,889,338
Patented June 2, 1959

2,889,338
EPOXIDIZED ESTERS

Joachim Dazzi, Dayton, Ohio, assignor to Monsanto Chemical Company, St. Louis, Mo., a corporation of Delaware No Drawing. Application July 28, 1955
Serial No. 525,080

1 Claim. (Cl. 260—348)

The present invention relates to derivatives of olefinic fatty acids and more particularly provides new and valuable epoxidized mixed esters of pentaerythritol, methods of producing the same, and vinyl chloride polymers plasticized with the new compounds.

According to the invention there are provided compounds in which there has been substituted the epoxy

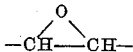

group for at least one olefinic —CH:CH— group of a mixed ester of pentaerythritol with an unconjugated $C_{18}$ olefinic fatty acid and an aromatic acid selected from the class consisting of benzoic and toluic acids. Replacement of the olefinic —CH:CH— group or groups of said mixed ester by the epoxy group is readily effected by contacting the ester with an epoxidizing agent selected from the class consisting of (a) a solution of hydrogen peroxide in a fatty acid of from 1 to 4 carbon atoms, (b) a fatty per acid of from 1 to 4 carbon atoms, and (c) perbenzoic acid.

Mixed esters useful for the present purpose may be designated by the formula

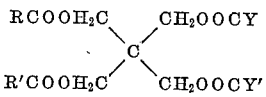

in which R is an aliphatic, unconjugated olefinic hydrocarbon radical of 17 carbon atoms, R' is an aryl radical selected from the class consisting of the phenyl and tolyl radicals and Y and Y' are selected from the class consisting of R and R'. The presently useful mixed esters are readily obtainable, in known manner, by the reaction of pentaerythritol with a quantity of benzoic or toluic acid which is insufficient to esterify all of the hydroxy groups of the pentaerythritol, and subsequent reaction of the partial ester thus obtained with a $C_{18}$ non-conjugated olefinic fatty acid to obtain a completely esterified product. Examples of mixed esters useful for the present purpose and having the above formula are: pentaerythritol benzoate trioleate, pentaerythritol dibenzoate dioleate, pentaerythritol oleate tribenzoate, pentaerythritol 4-toluate trioleate, pentaerythritol benzoate trilinoleate, pentaerythritol di-2-toluate dilinoleate, pentaerythritol linoleate tribenzoate, pentaerythritol linolenate tribenzoate, pentaerythritol 3-toluate trioleate, etc. Also useful are mixed esters obtainable by employing, as the fatty acid reactant, a technical mixture of the $C_{18}$ non-conjugated, olefinic fatty acids, for example, a mixture of oleic and linoleic acid. Reaction of pentaerythritol with appropriate molar quantities of such a mixture may give pentaerythritol mono-oleate mono-linoleate, and subsequent esterification with benzoic acid in the appropriate amount will give pentaerythritol dibenzoate mono-oleate mono-linoleate. Further, the aromatic esterifying acid radicals of the ester may be mixed, i.e., the presently useful ester may be one derived from both benzoic and toluic acid, e.g., pentaerythritol dibenzoate 4-toluate oleate or pentaerythritol benzoate di-3-toluate linoleate. The presently useful pentaerythritol esters, as shown in the above formula, must contain at least one non-conjugated $C_{17}$ radical and at least one phenyl or tolyl radical in the acid portion of the molecule.

In preparing the present epoxy compounds, the pentaerythritol mixed ester which is to be converted to the epoxy compound is simply mixed with one of the oxidizing agents mentioned above and the resulting mixture is allowed to stand at ordinary or moderately elevated temperatures until formation of the epoxide is completed. This may be determined by noting lack of unsaturation in the reaction product or by analyzing the oxygen content of the reaction mixture. Specific examples of suitable oxidizing agents useful for the present purpose are solutions of hydrogen peroxide in formic acid, acetic acid, propionic acid, butyric acid, etc., or such per acids as performic acid, peracetic acid, perpropionic acid, perbutyric acid, or perbenzoic acid.

The epoxidized esters are stable, high boiling materials which range from clear, yellow, viscous liquids to waxy or crystalline solids. They are advantageously employed for a variety of industrial purposes, for example, as textile-treating agents and as lubricant additives, but they are particularly valuable as plasticizers for vinyl chloride polymers. The present epoxy compounds are completely compatible with such polymers and show no exudation of plasticizer even at plasticizer content of up to 50 percent. Although the quantity of plasticizer will depend upon the particular polymer to be plasticized and upon its molecular weight, it is generally found that compositions having from 5 percent to 50 percent by weight of plasticizer will, in most cases, be satisfactory for general utility. The good flexibility of the plasticized compositions increases with increasing plasticizer concentration.

The invention is further illustrated, but not limited, by the following examples:

Example 1

Benzoic acid (91.6 grams, 0.75 mole) was melted and then added to 68.3 grams (0.5 mole) of pentaerythritol. The resulting mixture was heated, with stirring, at a temperature of 180° C. in a nitrogen atmosphere for 3 hours. During this period, 10 ml. of reaction water was collected. At this point 352.5 grams (1.25 moles) of oleic acid was added to the reaction mixture and heating was continued for an additional 4.5 hours at a temperature of from 210° C. to 225° C. An additional 18.1 ml. of water was collected during said 4.5 hour heating period, and the acid number of the reaction mixture was found to be 33.5 at the end of said period. There was then added another 28.5 grams of oleic acid and heating of the whole was continued for an additional four hours at substantially the same temperature. The resulting reaction mixture was subsequently heated for 1.5 hours in a nitrogen atmosphere at a pressure of 1 mm. and a pot temperature of 240–260° C. to remove any low boiling material. The residue, 463 grams, $n_D^{25}$ 1.4892, comprised a mixture of pentaerythritol benzoate trioleate and pentaerythritol dibenzoate dioleate. It was epoxidized as follows:

To 357 grams of said residue there was added dropwise, with stirring, during about one hour, 190 grams of 40 percent peracetic acid containing 12 grams of sodium acetate. A slight exothermic reaction was noted, with the temperature of the reaction mixture rising from 15° C. to 25° C. Stirring of the whole was then continued for an additional four hours. The reaction mixture was then poured into ice cold brine, and the resulting mixture was diluted with ether. The organic layer thus obtained was washed neutral. Distillation of the washed product in a nitrogen atmosphere to remove material boiling below 101° C./1 mm. gave 335 grams of residue. This was heated at 80° C. with decolorizing clay and then filtered. The filtrate, $n_D^{25}$ 1.4891, a very viscous, light-colored liquid, was the epoxidized mixture of pentaerythritol benzoate trioleate and pentaerythritol dibenzoate dioleate, the presence of oxirane-oxygen in said filtrate being determined by the method described on p. 414 of volume 19 (1947) of "Industrial and Engineering Chemistry, Analytical Edition."

*Example 2*

This example shows testing of the epoxidized product of Example 1 as a plasticizer for polyvinyl chloride.

Sixty parts of polyvinyl chloride and forty parts by weight of the said product were mixed on a rolling mill to a homogeneous blend. During the milling there was observed substantially no fuming and discoloration. A molded sheet of the mixture was clear, transparent, and substantially colorless. Testing of the molded sheet for low temperature flexibility, according to the Clash-Berg method, gave a value of minus 17.3° C. Tests on the volatility characteristics of the plasticized composition employing the carbon absorption method of the Society of the Plastics Industry gave a value of 0.9 percent, which showed excellent retention of plasticizer and indicated good temperature characteristics of the composition. The plasticized material had a water-absorption value of 0.44 percent after immersion in water for 24 hours at 25° C., and a solids loss value of 0.10 after such immersion. When subjected to heat at a temperature of 325° F. for a period of 30 minutes, the clarity and color of the molded sheet were substantially unchanged.

The kerosene resistance of the epoxidized product of Example 1 was tested as follows: 60 parts by weight of polyvinyl chloride and 40 parts by weight of said product were milled together to a homogeneous blend. Molded test specimens were prepared therefrom, said specimens being circles having a diameter of two inches and a thickness of 2 mm. The test specimens were immersed in kerosene for 24 hours at a temperature of 50° C., wiped dry, and then oven-dried at 50° C. for 44 hours. The dried specimens showed a weight change of minus 11.4 percent as compared to the initial weight thereof.

This substantial non-extractibility of the present residue by kerosene from polyvinyl chloride resins plasticized by the same is remarkable in that commonly-employed plasticizers are readily extracted when submitted to the same test. Thus, like-dimensioned molded test specimens of a milled blend consisting of 60 percent polyvinyl chloride and 40 percent dioctyl phthalate suffered a weight loss of 76.7 percent of the phthalate when submitted to the same test.

Instead of the mixture of epoxidized pentaerythritol benzoate trioleate and pentaerythritol dibenzoate dioleate of the above examples, likewise useful as polyvinyl chloride plasticizers are other epoxidized mixed esters of pentaerythritol and an unconjugated $C_{18}$ olefinic fatty acid and benzoic or 2-, 3- or 4-toluic acid. Thus, by employing 40 parts by weight of the reaction product of a fatty per acid of from 1 to 4 carbon atoms and pentaerythritol 2-, 3- or 4-toluate trioleate or pentaerythitol dibenzoate dilinoleate or dilinolenate with 60 parts by weight of polyvinyl chloride or 60 parts by weight of a vinyl chloride-vinyl acetate copolymer known to the trade as "Vinylite," there are obtained clear, colorless compositions of very good flexibility and stability. Also, instead of employing the fatty per acids for preparing the present epoxidized mixed esters, likewise useful as epoxidizing agents are perbenzoic acid or hydrogen peroxide solutions of the lower fatty acids.

While the above examples show only a composition in which the ratio of plasticizer to polymer content is 40:60, the content of epoxidized ester to polyvinyl chloride may be widely varied, depending on the properties desired in the final product. For many purposes, a plasticizer content of, say, from only 10 to 20 percent is preferred.

Although the invention has been described particularly with reference to the use of the present epoxidized esters as plasticizers for polyvinyl chloride, these epoxy mixed esters are advantageously employed also as plasticizers for copolymers of vinyl chloride, for example, the copolymers of vinyl chloride with vinyl fluoride, vinylidene chlorofluoride, vinylidene chloride, methyl methacrylate, acrylonitrile, etc. Preferably, such copolymers have a high vinyl chloride content, i.e., a vinyl chloride content of at least 70 percent of vinyl chloride and up to 30 percent by weight of a copolymerizable monomer.

The plasticized polyvinyl halide compositions of the present invention have good thermal stability. In addition to their plasticizing activity, they demonstrate a marked stabilizing effect for polyvinyl chloride. Also, while the present epoxy esters are of general utility in softening vinyl chloride polymers, they may be used as the only plasticizing component in a compounded vinyl chloride polymer, or they may be used in conjunction with other plasticizers.

What is claimed is:

A product in which there has been substituted the epoxy

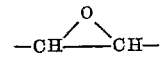

group for an olefinic group in a mixture of pentaerythritol benzoate trioleate and pentaerythritol dibenzoate dioleate.

References Cited in the file of this patent

UNITED STATES PATENTS

| | | |
|---|---|---|
| 2,464,137 | Levy | Mar. 8, 1949 |
| 2,477,608 | Irons | Aug. 2, 1949 |
| 2,477,609 | Irons | Aug. 2, 1949 |
| 2,485,160 | Niederhauser | Oct. 18, 1949 |

OTHER REFERENCES

Ralston: "Fatty Acids and their Derivatives," pp. 99–104, 132–136 (1948).